US006486477B1

(12) United States Patent
Suzuki et al.

(10) Patent No.: US 6,486,477 B1
(45) Date of Patent: Nov. 26, 2002

(54) RADIOGRAPHIC INTENSIFYING SCREEN SET

(75) Inventors: Yujiro Suzuki, Kanagawa (JP); Masaaki Nakamura, Kanagawa (JP); Michio Tanaka, Kanagawa (JP); Katsutoshi Yamane, Kanagawa (JP); Kenji Takahashi, Kanagawa (JP)

(73) Assignees: Kasei Optonix Ltd., Kanagawa (JP); Fuji Photo Film Co., Ltd., Minamiashigara (JP)

( * ) Notice: Subject to any disclaimer, the term of this patent is extended or adjusted under 35 U.S.C. 154(b) by 0 days.

(21) Appl. No.: 09/447,955

(22) Filed: Nov. 29, 1999

(30) Foreign Application Priority Data

Nov. 30, 1998 (JP) ........................................ 10-340284

(51) Int. Cl.[7] ........................................ G01T 1/00

(52) U.S. Cl. ............................ 250/483.1; 250/486.1; 250/487.1

(58) Field of Search ......................... 250/486.1, 487.1, 250/472.1, 581, 483.1; 252/301.33, 301.36

(56) References Cited

U.S. PATENT DOCUMENTS

| | | | | | |
|---|---|---|---|---|---|
| 4,205,234 | A | * | 5/1980 | Suzuki et al. | 250/483 |
| 4,710,637 | A | * | 12/1987 | Lucley et al. | 250/486.1 |
| 4,835,396 | A | * | 5/1989 | Kitada et al. | 250/186.1 |
| 5,432,351 | A | * | 7/1995 | Pesce et al. | 250/486.1 |
| 5,477,053 | A | | 12/1995 | Umemoto et al. | 250/483.1 |
| 5,893,957 | A | * | 4/1999 | Suzuki | 156/230 |
| 6,329,662 | B1 | * | 12/2001 | Yamane et al. | 250/483.1 |

* cited by examiner

*Primary Examiner*—Huy Mai
(74) *Attorney, Agent, or Firm*—Oblon, Spivak, McClelland, Maier & Neustadt, P.C.

(57) ABSTRACT

A radiographic intensifying screen set comprising a pair of a front intensifying screen and a rear intensifying screen, each comprising a support and a plurality of phosphor layers each having a binder resin and a phosphor dispersed therein, provided on the support, wherein at least some of the phosphor layers of the respective front intensifying screen and rear intensifying screen contain a fluorescent dye or a fluorescent pigment which absorbs some of emitted lights from the phosphors and emits lights having other wavelengths, the support for the front intensifying screen is a light-reflective support, and the support for the rear intensifying screen is a light-absorptive support.

15 Claims, No Drawings

RADIOGRAPHIC INTENSIFYING SCREEN SET

REARGROUND OF THE INVENTION

1. Field of the Invention

The present invention relates to a radiographic intensifying screen set (hereinafter referred to as intensifying screen set) comprising a pair of a front intensifying screen and a rear intensifying screen, for radiographing.

2. Discussion of Rearground

With respect to a radiographic intensifying screen (hereinafter referred to as intensifying screen), in order to improve sensitivity or sharpness, various improvements have heretofore been made, such as improving light-scattering characteristics of a support or a protective layer to be used for it, making phosphor layers have a multi-layer structure, or coloring the phosphor layers by e.g. a dye. However, it has been desired to develop an intensifying screen having more improved sensitivity and image quality, in the market. Further, with respect to the improvements in characteristics of an intensifying screen, although numbers of proposals have been made with respect to improvements in mainly characteristics of the intensifying screen alone, only a few proposals have been made with respect to constitution of the intensifying screen as an intensifying screen set.

It is an object of the present invention to provide an intensifying screen set which is excellent in both sensitivity and sharpness, and which presents a radiograph having an excellent image quality.

The present inventors have conducted extensive studies on correlation between an intensifying screen set comprising intensifying screens having various constitutions, and image quality of a radiograph which will be obtainable by using the intensifying screen set, and they have found that the above-mentioned objects can be achieved when each of phosphor layers for front and rear intensifying screens have a multi-layer structure, a fluorescent dye or a fluorescent pigment is contained in the phosphor layers, and particle size distribution of phosphors in the phosphor layers and light-reflection characteristics of the supports are specified.

SUMMARY OF THE INVENTION

The present invention provides:

(1) a radiographic intensifying screen set comprising a pair of a front intensifying screen and a rear intensifying screen, each comprising a support and a plurality of phosphor layers each having a binder resin and a phosphor dispersed therein, provided on he support, wherein at least some of the phosphor layers of the respective front intensifying screen and rear intensifying screen contain a fluorescent dye or a fluorescent pigment which absorbs some of emitted lights from the phosphors and emits lights having other wavelengths, the support for the front intensifying screen is a light-reflective support, and the support for the rear intensifying screen is a light-absorptive support, (2) the radiographic intensifying screen set according to the above-mentioned (1), wherein the phosphors in the phosphor layers are aligned so that the average particle size decreases from the surface side (the side from which the emitted lights are taken out) toward the support side, and (3) the radiographic intensifying screen set according to the above-mentioned (1) or (2), wherein a light-scattering protective layer having a transmission of at least 40% and a haze ratio of at least 20%, is provided on the surface of each of the front intensifying screen and the rear intensifying screen.

DETAILED DESCRIPTION OF THE PREFERRED EMBODIMENTS

Now, the present invention will be explained in further detail.

The intensifying screen set of the present invention can be produced in the same manner as a conventional intensifying screen set, except that a fluorescent dye or a fluorescent pigment (hereinafter such fluorescent dye and pigment will generically be referred to simply as “fluorescent dye”) is added to at least some of the phosphor layers of the respective front intensifying screen and rear intensifying screen constituting the intensifying screen set, the phosphor particles in the phosphor layers are specifically aligned, and supports having specific light-reflection characteristics are employed.

Namely, both front intensifying screen and the rear intensifying screen constituting the intensifying screen set, are produced in such a manner that a predetermined amount of phosphor and fluorescent dye are mixed with a binder such as nitrocellulose, an organic solvent is further added thereto to prepare a phosphor coating solution having a suitable viscosity, the coating solution is coated on each of the supports by e.g. a knife coater or a roll coater, followed by drying to form a phosphor layer, and a protective layer is further formed on this phosphor layer, as the case requires, to obtain a front intensifying screen and a rear intensifying screen.

Here, the front and rear intensifying screens constituting the intensifying screen set of the present invention, do not have a phosphor layer of single-layer structure which is formed by one kind of phosphor coating solution having phosphors having a single particle size distribution suspended therein, but have a plurality of phosphor layers on the respective supports, which are formed by using at least two kinds of phosphor coating solutions having different particle size distributions, coating one phosphor coating solution on the respective supports, and after drying or in a non-dried state, successively coating another phosphor coating solution thereon. In such a case, when a plurality of phosphor layers are formed by successively coating phosphor coating solution from one containing a phosphor with a smaller average particle size on the support, and when the phosphor particles are aligned so that the particle size is smaller at the support side than at the surface side (the side from which the emitted lights are taken out), the layer of the phosphor having a smaller particle size than the surface side, aligned at the support side, functions as a close reflective layer of lights, and suppress scattering of emitted lights from the phosphors. Accordingly, as compared with a case where phosphors having a uniform particle size distribution are uniformly aligned on the entire phosphor layer, an effect to improve the sharpness, in addition to an effect to improve sensitivity by the light-reflective support, can be obtained in the case of the light-reflective support, and in the case of the light-absorptive support, an effect to improve sensitivity, in addition to an effect to improve sharpness, can be obtained. Accordingly, effects to improve sensitivity and sharpness can be obtained for both supports.

In order to improve dispersibility of phosphors in the respective coating solutions, it is preferred to carry out a dispersion treatment by e.g. a ball mill to the phosphor coating solutions, after the phosphor coating solutions to form the respective phosphor layers are prepared and before coated, as the packing density of the phosphors in the phosphor layers after coating will be high, and the uniformity of the coated phosphor layer will be excellent.

In the intensifying screen set of the present invention, the fluorescent dye to be contained in the phosphor layer, may be contained in the phosphor layer of at least one of front and rear intensifying screens. With respect to the content (percentage by weight of the added fluorescent dye to the weight of the phosphors in the phosphor layers) in the phosphor layers of both front and rear intensifying screens, if it is small, absorption of the emitted lights from the phosphors will be inadequate, and if it is high, the absorption amount of the emitted lights from the phosphors will be higher than the emission amount from the dye, whereby sensitivity will be decrease. Accordingly, the content of the fluorescent dye to be added to the phosphor layer is preferably at the level of from 0.001 to 0.05%, more preferably at the level of from 0.002 to 0.02%, to the phosphors, depending upon the type of the fluorescent dye to be added, as the absorption amount of the emitted lights from the phosphors and the emission from the fluorescent dye will be well balanced.

As mentioned above, when a fluorescent dye is added to the phosphor layer of at least one of front intensifying screen and the rear intensifying screen, some of the emitted lights from the phosphors are absorbed by the fluorescent dye contained in the phosphor layer until the emitted lights reach the surface of the intensifying screen, and converted to fluorescent lights having longer wavelengths. By adjusting the emission wavelength after conversion to the spectral sensitivity of a film emulsion, the sensitivity will improve, and the absorption rate of the emitted lights at the film emulsion layer will be high, whereby the crossover effect due to transmission of lights through film base will decrease, and sharpness will improve.

The fluorescent dye to be used in the present invention is a substance which absorbs some of the emitted lights from the phosphors in the phosphor layers, and emits visible lights. For example, when $Gd_2O_2S$:Tb phosphor is used as the phosphor, this phosphor emits lights having main peak wavelengths of emission spectrum in the vicinity of 545 nm, and the fluorescent dye is one which absorbs emitted lights except lights having wavelengths in the vicinity of 545 nm, and emits lights having wavelengths in the vicinity of 545 nm. The emission peak wavelength of the fluorescent dye is set to the spectral sensitivity of silver halide photosensitive materials. Specifically, a fluorescent dye or a fluorescent pigment of an organic or inorganic compound which absorbs lights having wavelengths of at most 500 nm, and which has an emission peak within a wavelength range of from 450 to 600 nm, is preferred. The emission peak is more preferably within a range of from 490 to 600 nm, particularly preferably within a range of from 500 to 570 nm.

Such a fluorescent dye has an emission quantum yield (percentage of number of emission photons to the number of absorbed photons) of preferably at least 20%, more preferably at least 40%.

As the fluorescent dye, known dyes and pigments, such as dyes and pigments as described in "Dye Manual" (pages 315–1109, compiled by Organic Synthesis Institute, 1970 and "Coloring Material Technology Handbook" (pages 225–417, compiled by Coloring Material Institute, 1989) may be used. Particularly, dyes as described in "Laser Dyes" (Mitsuo Maeda, published by Academic Press, 1984) are preferred. Specifically, carbocyanine dyes in Table 4 at pages 26–29, phthalocyanine dyes in Table 11 at pages 74–75, xanthene dyes in Table 12 at pages 76–105, triarylmethane dyes in Table 13 at page 106, acridine dyes in Table 14 at pages 107–110, condensed ring compounds in Table 18 at pages 137–149, coumarin and azacoumarin dyes in Table 23 at pages 189–238, quinolone and azaquinolone dyes in Table 25 at pages 239–246, oxazole and benzoxazole compounds in Table 26 at pages 247–261, furan and benzofuran compounds in Table 29 at pages 273–275, pyrazoline compounds in Table 30 at page 276, phthalimido and naphthalimido compounds in Table 31 at page 277, peteridine compounds in Table 32 at page 282, and pyrylium, phosphorin, boraziadinium and pyridine compounds in Table 33 at page 283, may, for example, be mentioned. Further, diketopyrrolopyrrole compounds as disclosed in JP-A-58-210084, and perylene compounds as disclosed in JP-A-7-188178, may, for example, be used.

The fluorescent dye or the fluorescent pigment preferably has a maximum (peak) wavelength of the absorption spectrum within a range of from 350 to 500 nm, and the maximum wavelength of the fluorescence (emission) spectrum within a range of from 500 to 600 nm. More preferably, the maximum wavelength of the absorption spectrum is within a range of from 400 to 490 nm, and the maximum wavelength of the fluorescence spectrum is within a range of from 490 to 600 nm. Still more preferably, the maximum wavelength of the absorption spectrum is within a range of from 400 to 490 nm, and the maximum wavelength of the fluorescence spectrum is within a range of from 500 to 570 nm. Among the above-mentioned compounds, as examples of such a fluorescent dye or fluorescent pigment, carbocyanine dyes, xanthene dyes, triarylmethane dyes, acridine dyes, coumarin and azocoumarin dyes, phthalimido and naphthalimido compounds, pyrylium compounds, diketopyrrolopyrrole compounds and perylene compounds may, for example, be mentioned. Particularly preferably, the maximum wavelength of the fluorescence spectrum is within a range of from 500 to 555 nm. As examples of such a fluorescent dye or fluorescent pigment, carbocyanine dyes, triarylmethane dyes, coumarin dyes, phthalimido and naphthalimido compounds, diketopyrrolopyrrole compounds and perylene compounds may be mentioned.

Such a fluorescent dye or fluorescent pigment preferably has no (short) afterglow. Namely, one having a fluorescence life of at most $10^{-2}$ second is preferably used. Further, it is preferred that such a fluorescent dye or fluorescent pigment is less likely to undergo aging or decomposition due to light or heat.

The phosphor to be used for each of the phosphor layers in the intensifying screen set of the present invention is not particularly limited in view of its composition, and at least one phosphor which emits lights having a high luminance when irradiated with X-rays, such as CaWO4, YTaO4, $YTaO_4$:Tm, $YTaO_4$:Nb, $BaSO_4$:Pb, $HfO_2$:Ti, $HfP_2O_7$:Cu, $CdWO_4$, $GdTaO_4$:Tb, $Gd_2O_3$. $Ta_2O_5$.$B_2O_3$:Tb, $Gd_2O_2S$:Tb, $(Gd, Y)_2O_2S$:Tb or Tm, may be used.

The binder resin to be used for the phosphor coating solution to produce the intensifying screen set of the present invention, is not particularly limited so long as it is a conventional binder for intensifying screens, such as nitrocellulose, cellulose acetate, ethylcellulose, polyvinylbutyral, linear polyester, polyvinyl acetate, a vinylidene chloride/vinyl chloride copolymer, a vinyl chloride/vinyl acetate copolymer, a polyalkyl-(meth) acrylate, polycarbonate, polyurethane, cellulose acetate butyrate, polyvinyl alcohol, gelatin, a polysaccharide such as dextrin, or gum arabic. The amount of the binder resin is particularly preferably from 2 to 10 wt % to the phosphors in the phosphor layers, not to decrease sharpness and durability of the obtained intensifying screen set.

The organic solvent to be used for preparation of the phosphor coating solution may, for example, be ethanol, methyl ethyl ether, butyl acetate, ethyl acetate, ethyl ether or xylene.

To the phosphor coating solution, a dispersing agent such as phthalic acid or stearic acid, or a plasticizer such as triphenyl phosphate or diethyl phthalate may be added, as the case requires.

As the supports to be used for the intensifying screen set of the present invention, a light-reflective support is used for the front intensifying screen, and a light-absorptive support is used for the rear intensifying screen.

In the intensifying screen set of the present invention, the light-reflective support is one having a reflectance at its surface of at least about 80% to lights having wavelength ranges of from 450 nm to 700 nm, and the light-absorptive support is one having a reflectance at its surface of at most about 5%.

Specifically, the materials to be the bases for the supports for the front and rear intensifying screens, may be one based on the same material for a support to be used for a conventional intensifying screen, such as a film of cellulose acetate, cellulose propionate, cellulose acetate butyrate, polyester such as polyethyleneterephthalate, polystyrene, polymethylmethacrylate, polyamide, polyimide, a vinyl chloride/vinyl acetate copolymer or polycarbonate, a baryta paper sheet, a resin-coated paper sheet, a normal paper sheet or an aluminum alloy foil. As the support for the front intensifying screen, one comprising the above-mentioned material as the base, and a light-reflective material such as titanium dioxide or calcium carbonate incorporated therein, or bubbles contained therein, may, for example, be used.

Further, instead of using the above-mentioned light-reflective support as the support, a light-reflective layer made of a reflective material having a high refractive index, and having a relatively little X-ray absorption, such as MgO, $Al_2O_3$, $SiO_2$, ZnO, $TiO_2$ or ZnS, as disclosed in JP-A-9-217899, may be formed between the support and the phosphor layer adjacent thereto. The light-reflective layer is preferably one having an excellent sharpness of reflection, and accordingly, it is preferably one having an adequately small layer thickness and presenting an adequately high reflectance. Accordingly, the light-reflective material to be used for the light-reflective layer is preferably a material having a small particle size with an average particle size of at most 0.5 $\mu$m. The reflectance of the light-reflective layer is almost the same for the light-reflective support of the present invention, and the reflectance is preferably at least 85% in the case of preparing a reflective layer with a higher reflectiveness. In the case of forming the above-mentioned light-reflective layer between the phosphor layer and the support adjacent thereto also, a light-reflective support may be used as the support.

On the contrary, as the support for the rear intensifying screen, one comprising the above-mentioned material as the base and a light-absorptive material such as carbon black incorporated therein, may be used.

Further, instead of using the above-mentioned light-absorptive support as the support, a light-absorptive layer made of light-absorptive materials including carbon black, and having a reflectance at its surface of at most about 5%, preferably at most 3%, may preliminarily be formed between the support and the phosphor layer adjacent to the support. Also with respect to the rear intensifying screen, in the case of forming the above-mentioned light-absorptive layer between the phosphor layer and the support adjacent thereto, a light-absorptive support may be used as the support.

The reflectances of the support, the light-reflective layer and the light-absorptive layer to be the bases for the phosphor layer, are diffused reflectances at the surface. The reflectance can be obtained by using an integrating-sphere having a $BaSO_4$ powder uniformly coated on the entire surface, for example, a 150 $\phi$ integrating-sphere (150-0901), with an autographic spectrophotometer Model U-3210 manufactured by Hitachi Ltd., and measuring the reflectance against the standard white board (210-0740). The wavelength for measuring the reflectance is determined by considering the emission wavelength of the phosphor constituting each intensifying screen. When the emitted lights have plural wavelengths peaks, or when the peak is broad, measurements are carried out at the respective wavelengths, and the reflectance is obtained by weighted average by considering the intensity of emitted lights.

As mentioned above, by employing a light-reflective support as the support for the front intensifying screen, or forming a light-reflective layer between the phosphor layer and the support, and by employing a light-absorptive support as the support for the rear intensifying screen, or by forming a light-absorptive layer between the phosphor layer and the support, and by forming a plurality of phosphor layers thereon to obtain a multi-layer structure, the light-absorptive support can be used for the rear intensifying screen at the sensitivity range which has conventionally be obtained only by using the light-reflective support for the rear intensifying screen. Further, by using a light-reflective support for the front intensifying screen to decrease the weight of the phosphor coated on the front side, in order to effectively utilize the emitted lights from the rear intensifying screen, an intensifying screen set having a higher sensitivity and a higher sharpness, as compared with the conventional intensifying screen set, can be obtained. Further, by employing a light-absorptive support for the rear intensifying screen, the weight of the phosphor coated tends to increase as compared with the case where the light-reflective support is employed for the rear intensifying screen, at the same sensitivity, whereby granularity will improve.

Further, on the surface of the formed phosphor layer in the intensifying screen set of the present invention, a protective layer may be provided as the case requires. The protective layer is formed in such a manner that a cellulose derivative such as cellulose acetate, nitrocellulose or cellulose acetate butyrate, or a resin such as polyvinyl chloride, polyvinyl acetate, a vinyl chloride/vinyl acetate copolymer, polycarbonate, polyvinylbutyral, polymethylmethacrylate, polyvinylformal or polyurethane, is dissolved in a solvent to prepare a protective layer coating solution having a suitable viscosity, which is then coated on the uppermost phosphor layer (the side from which the emitted lights are taken out to the exterior) preliminarily formed on the support, followed by drying; or a preliminarily formed protective layer such as a transparent film of e.g. polyethylene terephthalate, polyethylene naphthalate, polyethylene, polyvinylidene chloride or polyamide, is laminated on the phosphor layer.

In the case where a protective layer is provided for the intensifying screen set of the present invention, the protective layer is preferably a light-scattering protective layer having light-scattering characteristics imparted thereto by e.g. uniformly dispersing light-scattering substance such as titanium dioxide or calcium carbonate in a form of fine particles, and having a transmission of at least 40% and a haze ratio of at least 20%, since light components having a large angle of incidence from the phosphor layer to the protective layer, which will lower the sharpness, can be effectively removed, whereby sharpness will improve.

The intensifying screen of the present invention can be produced by another method than the above-described production method. For example, a protective layer is preliminarily formed on a smooth substrate, a plurality of phosphor layers are successively formed thereon, and the phosphor layers are separated from said substrate together with the protective layer, and a support is bonded to the phosphor layer (to the other side to the protective layer), to produce an intensifying screen.

EXAMPLES

Now, the present invention will be described in further detail with reference to Examples. However, it should be understood that the present invention is by no means restricted to such specific Examples.

Preparation of Phosphor Coating Solution 20 parts by weight of a mixture comprising a polyvinylbutyral resin, a urethane resin and a plasticizer, was dissolved in 80 parts by weight of a mixed solvent comprising toluene, 2-butanol and xylene, followed by stirring to prepare a binder.

13 parts by weight of the binder, 87 parts by weight of a $Gd_2O_2S$:Tb phosphor having an average particle size of 3 $\mu$m, and $4.35\times10^{-3}$ part by weight (content: corresponding to 0.005 wt % to the phosphor) of an organic fluorescent dye (Coumarin 6 manufactured by Aldrich) were mixed and adequately stirred, followed by dispersion treatment by a ball mill to obtain a phosphor coating solution ①.

Further, a phosphor coating solution ② was prepared in the same manner as for the phosphor coating solution ① except that a $Gd_2O_2S$:Tb phosphor having an average particle size of 7 $\mu$m was used instead of the $Gd_2O_2S$:Tb phosphor having an average particle size of 3 $\mu$m, and a phosphor coating solution ③ was prepared in the same manner as for the phosphor coating solution ① except that a $Gd_2O_2S$:Tb phosphor having an average particle size of 5 $\mu$m was used instead of the $Gd_2O_2S$:Tb phosphor having an average particle size of 3 $\mu$m.

Further, a phosphor coating solution ④ was prepared in the same manner as for the phosphor coating solution ①, except that a mixed phosphor comprising 17 parts by weight of the $Gd_2O_2S$:Tb phosphor having an average particle size of 3 $\mu$m and 70 parts by weight of the $Gd_2O_2S$:Tb phosphor having an average particle size of 5 $\mu$m was used as the phosphor instead of 87 parts by weight of the $Gd_2O_2S$:Tb phosphor having an average particle size of 3 $\mu$m, and no organic fluorescent dye was added.

Further, a phosphor coating solution ⑤, a phosphor coating solution ⑥ and a phosphor coating solution ⑦ were prepared in the same manner as for the phosphor coating solution ①, the phosphor coating solution ② and the phosphor coating solution ③, respectively, except that no organic fluorescent dye was added.

Production of Intensifying Screen

Example 1

On a white polyethylene terephthalate film (Lumilar E-20 manufactured by Toray Industries, Inc.) with a thickness of 250 $\mu$m as a light-reflective support having titanium oxide incorporated therewith, the phosphor coating solution ① was coated to have a phosphor coating weight after drying of 20 mg/cm$^2$ by a blade coater, and in a state where the phosphor coating solution ① was not dried, the phosphor coating solution ② was further coated thereon to have a phosphor coating weight after drying of 25 mg/cm$^2$, followed by drying to form a plurality of phosphor layers having a double-layer structure on the support. Then, a protective layer of a polyethylene terephthalate film with a thickness of 6 $\mu$m having no light-scattering characteristic, having a heat sensitive adhesive preliminarily coated thereon, was bonded thereto. Then, satinizing was carried out by using a satin roll, to make a rugged pattern with a central line average roughness (Ra) of 1.0 $\mu$m on the surface of the protective layer, to produce a front intensifying screen F-1.

Further, a rear intensifying screen B-1 was produced in the same manner as for the front intensifying screen F-1, except that a black polyethylene terephthalate film (Lumilar X-30 manufactured by Toray Industries, Inc.) having carbon black incorporated therewith, was used as the support instead of the white polyethylene terephthalate film having titanium oxide incorporated therewith, and the phosphor coating solution ① was coated thereon with a coating weight of 30 mg/cm$^2$ instead of 20 mg/cm$^2$, and the phosphor coating solution ③ was coated thereon with a phosphor coating weight after drying of 40 mg/cm$^2$ instead of the phosphor coating solution ② with a coating weight of 25 mg/cm$^2$.

An intensifying screen set of Example 1 comprising a pair of the front intensifying screen F-1 and the rear intensifying screen B-1, was thus obtained.

Example 2

Methyl ethyl ketone was added to 500 g a rutile titanium dioxide powder (CR95 manufactured by Ishihara Sangyo Kaisha, Ltd.) having an average particle size of 0.28 $\mu$m and 100 g of an acryloyl binder (Crisscoat P1018GS manufactured by Dainippon Ink and Chemicals, Incorporated), followed by mixing and dispersing, to prepare a coating solution having a viscosity of 10 PS. The coating solution was uniformly coated on a transparent polyethylene terephthalate support with a thickness of 250 $\mu$m by using a doctor blade to have a layer thickness after drying of about 40 $\mu$m, to obtain a support with a light-reflective layer having a reflectance of about 90%.

Then, a front intensifying screen F-2 was produced in the same manner as for the front intensifying screen F-1 in Example 1, except that the above obtained support with a light-reflective layer was used as the support instead of the light-reflective support for the front intensifying screen F-1 in Example 1.

On the other hand, a support having a light-absorptive layer formed on its surface, was obtained in the same manner as for the support with a light-reflective layer for the front intensifying screen F-2, except that 300 g of a carbon black powder was used instead of 500 g of the rutile titanium dioxide powder.

Then, a rear intensifying screen B-2 was produced in the same manner as for the rear intensifying screen B-1 in Example 1, except that the support having a light-absorptive layer formed on its surface, obtained as the support, was used instead of the black polyethylene terephthalate film (Lumilar X-30 manufactured by Toray Industries, Inc.) having carbon black incorporated therewith.

An intensifying screen set of Example 2 comprising a pair of the front intensifying screen F-2 and the rear intensifying screen B-2, was thus produced.

Example 3

A front intensifying screen F-3 was produced in the same manner as for the front intensifying screen F-1 in Example 1, except that a highly reflective support (Lumilar E-62 manufactured by Toray Industries, Inc.) having titanium dioxide ($TiO_2$) and bubbles incorporated therewith, was used as the support, instead of the light-reflective support for the front intensifying screen F-1 in Example 1.

An intensifying screen set of Example 3 comprising a pair of the front intensifying screen F-3 and the rear intensifying screen B-2 obtained in Example 2, was thus obtained.

Example 4

A front intensifying screen F-4 was produced in the same manner as for the front intensifying screen F-1 in Example 1, except that a light-scattering protective layer of a polyethylene terephthalate film having 3 parts by weight of anatase titanium dioxide ($TiO_2$) as a light-scattering material having an average particle size of 0.36 $\mu$m incorporated with 97 parts by weight of the substrate, was used instead of the protective layer of a polyethylene terephthalate film having no light-scattering characteristic.

Further, a rear intensifying screen B-3 was produced in the same manner as for the rear intensifying screen B-1 in Example 1, except that the light-scattering protective layer for the front intensifying screen F-4, was used as the protective layer, instead of the protective layer of a polyethylene terephthalate film having no light-scattering characteristic.

An intensifying screen set of Example 4 comprising a pair of the front intensifying screen F-4 and the rear intensifying screen B-3, was thus obtained.

Comparative Example 1

Two sheets of intensifying screens R-1 comprising a phosphor layer of a single-layer structure, were produced in the same manner as for the front intensifying screen F-1 in Example 1, except that the phosphor coating solution ④ alone was coated to have a phosphor coating weight after drying of 50 mg/cm$^2$, instead of multiple coating of the phosphor coating solution ① and the phosphor coating solution ②, and an intensifying screen set of Comparative Example 1 comprising the intensifying screens R-1 as a pair of the front intensifying screen and the rear intensifying screen, was obtained.

Comparative Example 2

A front intensifying screen R-3F was produced in the same manner as for the rear intensifying screen B-1 in Example 1, except that the phosphor coating solution ⑤, instead of the phosphor coating solution ①, was coated on the support of the black polyethylene terephthalate film (Lumilar X-30 manufactured by Toray Industries, Inc.) having carbon black incorporated therewith, to have a phosphor coating weight after drying of 20 mg/cm$^2$, and the phosphor coating solution ⑥, instead of the phosphor coating solution ③, was coated thereon to have a phosphor coating weight after drying of 25 mg/cm$^2$.

Further, a rear intensifying screen R-3B was produced in the same manner as for the front intensifying screen F-1 in Example 1, except that the phosphor coating solution ⑤, instead of the phosphor coating solution ①, was coated on the light-reflective support of the white polyethylene terephthalate film (Lumilar E-20 manufactured by Toray Industries, Inc.) to have a phosphor coating weight after drying of 30 mg/cm$^2$, and the phosphor coating solution ⑦, instead of a phosphor coating solution ②, was coated thereon to have a phosphor coating weight after drying of 40 mg/cm$^2$.

An intensifying screen set of Comparative Example 2, comprising the front intensifying screen R-3F and the rear intensifying screen R-3B, was thus obtained.

Comparative Example 3

Two sheets of intensifying screens R-4 were produced in the same manner as for the intensifying screen R-3B in Comparative Example 2, except that the phosphor coating solution ①, instead of the phosphor coating solution ⑤, was coated as the phosphor coating solution, to have a phosphor coating weight after drying of 20 mg/cm$^2$, and the phosphor coating solution ③, instead of the phosphor coating solution ⑦, was coated thereon to have a coating weight after drying of 30 mg/cm$^2$, and an intensifying screen set of Comparative Example 3, comprising the intensifying screens R-4 as a pair of the front intensifying screen and the rear intensifying screen, was obtained.

Comparative Example 4

Two sheets of intensifying screens R-5 were produced in the same manner as for the intensifying screen R-4 in Comparative Example 3 except that the light-scattering protective layer used in Example 4 was employed as the protective layer, and an intensifying screen set of Comparative Example 4, comprising the intensifying screens R-5 as a pair of the front intensifying screen and the rear intensifying screen, was obtained.

With respect to each of the obtained intensifying screen sets, a film (UR-2 manufactured by Fuji Photo Film Co., Ltd.) was sandwiched between the front and rear intensifying screens, and sensitivity and sharpness were evaluated. The results are shown in Table 1.

Sensitivity and sharpness are expressed by relative values as compared with the sensitivity and MTF value of the intensifying screen set of Comparative Example 1 which are determined as 100, where the sensitivity was measured when exposed to X-rays with a tube voltage of 80 kV through a water phantom with a thickness of 10 cm, and the MTF value was measured at a spatial frequency of 2 LP/mm.

Example 5

With a purpose of evaluating if the characteristics of the intensifying screen sets of the present invention varied depending upon the type of the film, each of the intensifying screen sets obtained in Examples 1 to 4 and Comparative Examples 1 to 4 of the present invention, was combined with a radiographic film (photosensitive material 1) produced as mentioned hereinafter, and the sensitivity and sharpness were evaluated in the same manner, whereupon it was confirmed that results similar to each of Examples 1 to 4 and Comparative Examples 1 to 4 (the results as shown in Table 1) were obtainable. Here, the photosensitive material 1 obtained by the following method had a sensitivity and a gradient similar to the film (UR-2 manufactured by Fuji Photo Film Co., Ltd.) used for evaluation of each of the intensifying screen sets in Examples 1 to 4 and Comparative Examples 1 to 4.

Preparation of Photosensitive Material

Preparation of Crossover Cut Dye Layer

A dye I-31 (solid, 3 g) as disclosed in JP-A-4-14035 was dispersed in the method as disclosed in Example 1 of JP-A-4-14035, to obtain a dispersion A of dye fine crystal in water having an average particle size of 0.25 μm, an absorption maximum wavelength of 550 nm and a half width of 90 nm. The following compounds were added thereto so that the coating weights per 1 $m^2$ of one side of the photosensitive material were as follows.

| | |
|---|---|
| Dye dispersion A (as dye solid) | 50 mg |
| Gelatin | 0.35 g |
| Sodium polystyrene sulfonate (average molecular weight: 600,000) | 8.9 mg |
| Proxel (manufactured by ICI) | 1 mg |

The pH of the coating solution was adjusted to 6.0.

Preparation of Flat Silver Halide Emulsion O

A flat halide emulsion O was obtained in the same manner as for the flat particle emulsion C as disclosed in Example 1 of JP-A-7-104411, except that the chemical sensitizer was optionally changed. The following compounds were added thereto so that the coating weights per 1 $m^2$ of one side of the photosensitive material were as follows.

| | |
|---|---|
| Coated silver | 1.00 g |
| Gelatin | 1.00 g |
| Dextran (average molecular weight: 39,000) | 233 mg |

The other compounds as disclosed in JP-A-7-21916, from line 8 at page 12 to line 40 at page 13, were added so that the addition amounts per mol of silver were the same.

Preparation of Flat Silver Halide Emulsion U

A flat silver halide emulsion U was obtained in the same manner as for the emulsion T1 as disclosed in Example 1 of JP-A-9-222694. The following compounds were added thereto so that the coating weights per 1 $m^2$ of one side of the photosensitive material were as follows.

| | |
|---|---|
| Coated silver | 0.45 g |
| Gelatin | 0.40 g |
| Dextran (average molecular weight: 39,000) | 100 mg |

The other compounds as disclosed in JP-A-9-222694, from line 38 at page 16 to line 38 at page 17, were added so that the addition amounts per mol of silver were the same.

Preparation of Surface Protective Layer Coating Solution

The following compounds were added so that the coating weights per 1 $m^2$ of one side of the photosensitive material were as follows.

| | |
|---|---|
| Gelatin | 0.767 g |
| p-benzoquinone | 0.7 mg |

With respect to the other compounds, the same operation was carried out as for the preparation of the surface protective layer coating solution in Example 1 of JP-A-9-222694.

Preparation of Radiographic Material

On both sides of a support prepared in the same manner as in Example 1 (preparation of a support) in JP-A-9-222694, the prepared crossover cut layer, emulsion U layer, emulsion O layer and surface protective layer were coated in this order by simultaneous extrusion, followed by drying, to obtain a photosensitive material 1.

The photosensitive material had a water swelling ratio of 170%, a transmitted optical density of 550 nm by the dye dispersion A of 1.4, a total layer thickness of 3.2 μm, a PC layer thickness of 0.7 μm, an O layer thickness of 1.3 μm, a U layer thickness of 0.7 μm and a UC layer thickness of 0.5 μm. To obtain a certain density, required exposure with a monochromatic light having a wavelength of 450 nm was 9 times as much as the exposure with a monochromatic light having a wavelength of 550 nm, as measured by using an equal energy spectrophotometer.

TABLE 1

| | Front intensifying screen | Rear intensifying screen | Fluorescent dye | Support Front/Rear | Constitution of phosphor layer | Light-scattering protective layer | Sensitivity | Sharpness |
|---|---|---|---|---|---|---|---|---|
| Example 1 | F-1 | B-1 | Added | White/black | Multi-layer | Not used | 100 | 112 |
| Example 2 | F-2 | B-2 | Added | <<White>>/<<Black>> | Multi-layer | Not used | 100 | 115 |
| Example 3 | F-3 | B-2 | Added | <White>/<<Black>> | Multi-layer | Not used | 107 | 109 |
| Example 4 | F-4 | B-3 | Added | White/Black | layer layer | Used | 100 | 115 |
| Comparative Example 1 | R-1 | R-1 | Not added | White/White | Single-layer | Not used | 100 | 100 |
| Comparative Example 2 | R-3F | R-3B | Not added | Black/White | Multi-layer | Not used | 100 | 90 |
| Comparative Example 3 | R-4 | R-4 | Added | White/White | Multi-layer | Not used | 100 | 106 |

TABLE 1-continued

| | Front intensifying screen | Rear intensifying screen | Fluorescent dye | Support Front/Rear | Constitution of phosphor layer | Light-scattering protective layer | Sensitivity | Sharpness |
|---|---|---|---|---|---|---|---|---|
| Comparative Example 4 | R-5 | R-5 | Added | White/White | Multi-layer | Used | 100 | 109 |

Support
White: Light-reflective support (Lumilar E-20, manufactured by Toray Industries, Inc.)
Black: Light-absorptive support (Lumilar X-30, manufactured by Toray Industries, Inc.)
<<White>>: Support having a light-reflective layer provided thereon
<<Black>>: Support having a light-absorptive layer provided thereon
<White>: Light-reflective support containing bubbles (Lumilar E-62, manufactured by Toray Industries, Inc.)

When the intensifying screen set of the present invention having the above-mentioned constitution, is used for radiographing together with a radiographic film, a radiograph having a high sensitivity and a high sharpness can be obtainable as compared with a conventional intensifying screen set.

What is claimed is:

1. A radiographic intensifying screen set comprising a pair of a front intensifying screen and a rear intensifying screen, each screen comprising a surface side and a support having a side, and a plurality of phosphor layers each having a binder resin and a phosphor dispersed therein, provided on the support, wherein at least one of the phosphor layers of the front intensifying screen and the rear intensifying screen contain a fluorescent dye or a fluorescent pigment which absorbs some of emitted lights from the phosphors and emits lights having other wavelengths, and wherein the support for the front intensifying screen is a light-reflective support, and the support for the rear intensifying screen is a light-absorptive support.

2. The radiographic intensifying screen set according to claim 1, wherein the phosphors in the phosphor layers are aligned so that the average particle size decreases from a surface side of the phosphor layers (the side from which the emitted lights are taken out) toward the support.

3. The radiographic intensifying screen set according to claim 2, wherein at least some of the phosphor layers of the front intensifying screen and at least some of the phosphor layers of the rear intensifying screen contain said fluorescent dye or fluorescent pigment.

4. The radiographic intensifying screen set according to claim 2, wherein the light-reflective support comprises a support base containing light-reflective material incorporated therein or a support base containing a light-reflective layer thereon.

5. The radiographic intensifying screen set according to claim 4, wherein the light-absorptive support comprises a support base containing light-absorptive material incorporated therein or a support base containing a light-absorptive layer thereon.

6. The radiographic intensifying screen set according to claim 2, wherein the light-absorptive support comprises a support base containing light-absorptive material incorporated therein or a support base containing a light-absorptive layer thereon.

7. The radiographic intensifying screen set according to claim 1 or 2, wherein a light-scattering protective layer having a transmittance of at least 40% and a haze ratio of at least 20%, is provided on the surface of each of the front intensifying screen and the rear intensifying screen.

8. The radiographic intensifying screen set according to claim 7, wherein at least some of the phosphor layers of the front intensifying screen and at least some of the phosphor layers of the rear intensifying screen contain said fluorescent dye or fluorescent pigment.

9. The radiographic intensifying screen set according to claim 7, wherein the light-reflective support comprises a support base containing light-reflective material incorporated therein or a support base containing a light-reflective layer thereon.

10. The radiographic intensifying screen set according to claim 9, wherein the light-absorptive support comprises a support base containing light-absorptive material incorporated therein or a support base containing a light-absorptive layer thereon.

11. The radiographic intensifying screen set according to claim 7, wherein the light-absorptive support comprises a support base containing light-absorptive material incorporated therein or a support base containing a light-absorptive layer thereon.

12. The radiographic intensifying screen set according to claim 1, wherein at least some of the phosphor layers of the front intensifying screen and at least some of the phosphor layers of the rear intensifying screen contain said fluorescent dye or fluorescent pigment.

13. The radiographic intensifying screen set according to claim 1, wherein the light-reflective support comprises a support base containing light-reflective material incorporated therein or a support base containing a light-reflective layer thereon.

14. The radiographic intensifying screen set according to claim 13, wherein the light-absorptive support comprises a support base containing light-absorptive material incorporated therein or a support base containing a light-absorptive layer thereon.

15. The radiographic intensifying screen set according to claim 1, wherein the light-absorptive support comprises a support base containing light-absorptive material incorporated therein or a support base containing a light-absorptive layer thereon.

* * * * *